United States Patent
Hirano

(10) Patent No.: US 11,828,338 B2
(45) Date of Patent: Nov. 28, 2023

(54) ROTATIONAL RESISTANCE APPARATUS AND ELECTRONIC APPARATUS

(71) Applicant: CANON KABUSHIKI KAISHA, Tokyo (JP)

(72) Inventor: Junya Hirano, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/923,805

(22) Filed: Jul. 8, 2020

(65) Prior Publication Data
US 2021/0010546 A1  Jan. 14, 2021

(30) Foreign Application Priority Data
Jul. 10, 2019  (JP) ................................. 2019-128763

(51) Int. Cl.
*F16D 57/00*  (2006.01)
*F16D 65/16*  (2006.01)
*F16D 63/00*  (2006.01)

(52) U.S. Cl.
CPC ......... *F16D 57/002* (2013.01); *F16D 63/002* (2013.01); *F16D 65/16* (2013.01)

(58) Field of Classification Search
CPC ...... F16D 57/002; F16D 63/002; F16D 65/16; F16D 2121/18
See application file for complete search history.

(56) References Cited

U.S. PATENT DOCUMENTS 3,672,476 A * 6/1972 Hendershot ........... F16D 57/002
  192/21.5
3,962,595 A * 6/1976 Eddens ................. F16D 57/002
  310/93

(Continued)

FOREIGN PATENT DOCUMENTS

CN  104081081 A  10/2014
CN  105319931 A   2/2016
(Continued)

OTHER PUBLICATIONS

Office Action issued in Chinese Appln. No. 202010638078.1 dated May 30, 2022. English translation provided.

(Continued)

*Primary Examiner* — Melody M Burch
(74) *Attorney, Agent, or Firm* — ROSSI, KIMMS & McDOWELL LLP

(57) ABSTRACT

A rotational resistance apparatus includes a rotational shaft member including a first shaft portion, a second shaft portion, and a third shaft portion disposed between the first and second shaft portions and having a diameter larger than that of each of the first and second shaft portions, and the rotational shaft member being made of a magnetic material, a housing member configured to hold the rotational shaft member and made of a magnetic material, a first coil disposed between an outer circumferential surface of the first shaft portion and an inner circumferential surface of the housing member, a second coil disposed between an outer circumferential surface of the second shaft portion and the inner circumferential surface of the housing member, and a magnetic viscose fluid disposed between an outer circumferential surface of the third shaft portion and the inner circumferential surface of the housing member.

12 Claims, 7 Drawing Sheets

(56) References Cited

U.S. PATENT DOCUMENTS

| | | | | |
|---|---|---|---|---|
| 4,681,197 A | * | 7/1987 | Pedu | F16D 37/02 192/21.5 |
| 6,102,827 A | * | 8/2000 | Teasdale | F16D 37/02 192/21.5 |
| 2004/0074718 A1 | * | 4/2004 | Takeda | F16D 63/00 188/267 |
| 2008/0150458 A1 | * | 6/2008 | Ryynanen | F16D 57/002 318/362 |
| 2013/0175132 A1 | * | 7/2013 | Battlogg | F16C 33/6688 192/21.5 |
| 2013/0242390 A1 | * | 9/2013 | Nomura | G02B 7/006 359/483.01 |
| 2014/0332331 A1 | * | 11/2014 | Gurocak | F16D 63/008 188/267.2 |
| 2014/0339029 A1 | * | 11/2014 | Ido | F16D 37/02 252/62.51 R |
| 2021/0096591 A1 | * | 4/2021 | Hirano | F16D 57/002 |
| 2021/0190155 A1 | * | 6/2021 | Nguyen | B60T 13/748 |

FOREIGN PATENT DOCUMENTS

| | | | |
|---|---|---|---|
| CN | 207584029 U | | 7/2018 |
| CN | 108368910 A | | 8/2018 |
| CN | 208764185 U | | 4/2019 |
| EP | 1677022 A1 | * | 7/2006 ............ B25B 21/02 |
| GB | 1462582 A | | 1/1977 |
| JP | 0320177 A | * | 1/1991 |
| JP | H08135697 A | | 5/1996 |
| JP | 2000184681 A | | 6/2000 |
| JP | 2002213517 A | | 7/2002 |
| JP | 2012037019 A | | 2/2012 |
| JP | 2014020539 A | | 2/2014 |
| JP | 2014181778 A | | 9/2014 |
| JP | 2016080165 A | | 5/2016 |
| KR | 101713109 B1 | | 3/2017 |
| WO | 9922156 A1 | | 5/1999 |

OTHER PUBLICATIONS

Li. "Design of Magnetorheological Fluid Braking System Used in Downward Belt Conveyor." Coal Mine Machinery. Mar. 2019: 10-12. vol. 40, No. 3. Cited in NPL 1. English abstract provided.
Office Action issued in Chinese Appln. No. 202010638078.1 dated Oct. 25, 2022. English translation provided.

* cited by examiner

ROTATIONAL RESISTANCE APPARATUS AND ELECTRONIC APPARATUS

BACKGROUND OF THE INVENTION

Field of the Invention

The present invention relates to a rotational resistance apparatus and an electronic apparatus.

Description of the Related Art

In recent years, there has been proposed a device that serves to generate resistance to an operation by an operator using a magnetic viscous fluid. Japanese Patent Laid-Open No. ("JP") 2014-20539 discloses a brake apparatus that applies a magnetic field to the magnetorheological fluid arranged around the rotor, increases the resistance to shear the magnetorheological fluid, and adjusts the braking torque for adjusting the rotation of the rotor. JP 2002-213517 discloses an adjusting apparatus that adjusts the braking force applied to a movable member that linearly moves.

In the braking apparatus disclosed in JP 2014-20539 needs to reduce the size of the rotor arranged on the inner diameter side of the coil for a compact structure of the braking apparatus. Thus, the braking torque also reduces due to the resistance of the rotor that shears the magnetorheological fluid. That is, it is difficult to reduce the size of the braking apparatus disclosed in JP 2014-20539 without degrading the performance.

The adjusting apparatus disclosed in JP 2002-213517 is an apparatus that adjusts the difficulty of the flow of the magnetic viscous fluid passing through the small flow path between the movable part and the fixed part by the magnetic field to adjust the braking force of the movable part. It is thus necessary to dispose a large amount of the magnetic viscous fluid along the driving direction of the movable member and move the movable member so that the magnetic viscous body flows in a small flow path, and thus the adjusting apparatus tends to become large. In addition, since the coil is incorporated in the movable member and the movable member can be rotated, the wiring configuration of the coil becomes complicated for the miniaturization.

SUMMARY OF THE INVENTION

The present invention provides a rotational resistance apparatus advantageous to a high performance and a compact structure.

A rotational resistance apparatus according to one aspect of the present invention includes a rotational shaft member including a first shaft portion, a second shaft portion, and a third shaft portion disposed between the first shaft portion and the second shaft portion and having a diameter larger than that of each of the first shaft portion and the second shaft portion, and the rotational shaft member being made of a magnetic material, a housing member configured to hold the rotational shaft member and made of a magnetic material, a first coil disposed between an outer circumferential surface of the first shaft portion and an inner circumferential surface of the housing member, a second coil disposed between an outer circumferential surface of the second shaft portion and the inner circumferential surface of the housing member, and a magnetic viscose fluid disposed between an outer circumferential surface of the third shaft portion and the inner circumferential surface of the housing member.

An electronic apparatus having the above rotational resistance apparatus also constitutes another aspect of the present invention.

Further features of the present invention will become apparent from the following description of exemplary embodiments with reference to the attached drawings.

DESCRIPTION OF THE EMBODIMENTS

Figure 1:
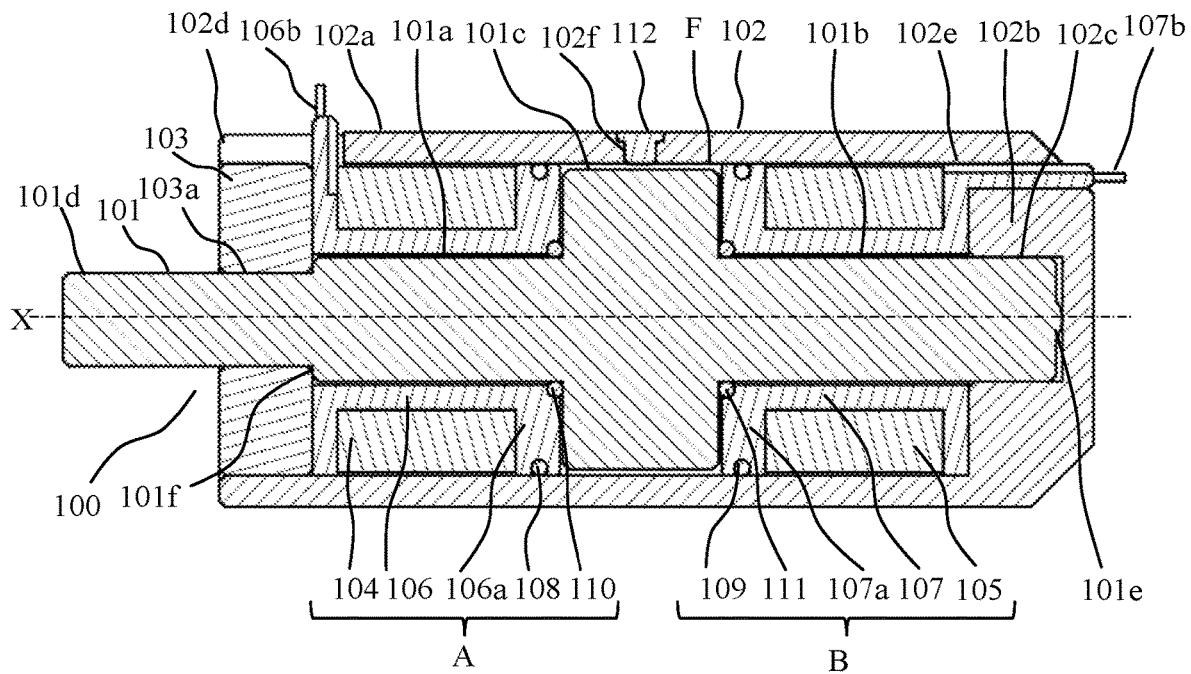
FIG. 1 is a sectional view of a rotational resistance apparatus according to a first embodiment.

Referring now to the accompanying drawings, a detailed description will be given of embodiments according to the present invention. Corresponding elements in respective figures will be designated by the same reference numerals, and a duplicate description thereof will be omitted.

First Embodiment

FIG. 1 is a sectional view of a rotational resistance apparatus (MR fluid device) according to this embodiment. The rotational resistance apparatus 100 includes a rotational shaft (rotational shaft member) 101 and a housing (housing member) 102.

The rotational shaft 101 is made of a magnetic material, and has a first shaft (first shaft portion) 101a, a second shaft (second shaft portion) 101b, a braking shaft (third shaft portion) 101c, a transmission shaft 101d, and a convex portion 101e. A step 101f is provided between the first shaft 101a and the transmission shaft 101d in order to restrict a movement of the rotational shaft 101 in a rotation center X direction. If it is not necessary to restrict the movement of the rotational shaft 101 in the rotation center X direction (axial direction), no step 101f is necessary.

A first coil 104, a second coil 105, a first bobbin 106, a second bobbin 107, and an MR fluid (magnetic viscose fluid) F are disposed inside the housing 102.

The housing 102 is made of a magnetic material, and has an exterior (cylindrical portion) 102a, notches 102d and 102e, and a through-hole 102f. The housing 102 includes a first disc (first disc portion) 103 having an engagement hole (first engagement portion) 103a, and a second disc (second disc portion) 102b having an engagement recess (second engagement portion) 102c. The first disc 103 contacts the step 101f, and the second disc 102b contacts the convex portion 101e. The outer circumferential surface of the first disc 103 is engaged with the inner circumferential surface of the housing 102.

The transmission shaft 101d is rotatably engaged with the engagement hole 103a on the first end side of the rotational shaft 101. The second shaft 101b is rotatably engaged with the engagement recess 102c on the second end side of the rotational shaft 101. Since the rotational shaft 101 is rotatably engaged with the engagement hole 103a and the engagement recess 102c, the braking shaft 101c can rotate without contacting the inner circumferential surface of the exterior 102a having an opposite outer circumferential surface. Since the step 101f and the convex portion 101e contact the first disc 103 and the second disc 102b, respectively, the rotational shaft 101 is restricted from moving in the rotation center X direction.

The exterior 102a and the first disc 103 are separately configured in this embodiment, but may be integrated with each other. The exterior 102a and the second disc 102b are integrated with each other in this embodiment, but may be separate from each other.

In this embodiment, since the step 101f and the convex portion 101e are arranged so as to sandwich the first disc 103 and the second disc 102b, the rotational shaft 101 is restricted from moving in the rotation center X direction but the movement of the rotational shaft 101 in the direction of the rotation center X may be restricted by another configuration. For example, the rotational shaft 101 can be restricted from moving in the rotation center X direction without providing the step 101f by providing a contact surface at the tip of the transmission shaft 101d.

An outer circumferential seal (first seal) 108 and an inner circumferential seal (third seal) 110 are disposed between the first coil 104 and the braking shaft 101c in the rotation center X direction. An outer circumferential seal (second seal) 109 and an inner circumferential seal (fourth seal) 111 are disposed between the second coil 105 and the braking shaft 101c in the rotation center X direction. The outer circumferential seal 108 is deformed so as to seal the gap between the outer circumferential surface of the first bobbin 106 and the inner circumferential surface of the exterior 102a. The outer circumferential seal 109 is deformed so as to seal the gap between the outer circumferential surface of the second bobbin 107 and the inner circumferential surface of the exterior 102a. The inner circumferential seal 110 is deformed so as to seal the gap between the inner circumferential surface of the first bobbin 106 and the outer circumferential surface of the first shaft 101a. The inner circumferential seal 110 is fixed so as to contact the braking shaft 101c. The inner circumferential seal 111 is deformed so as to seal the gap between the inner circumferential surface of the second bobbin 107 and the outer circumferential surface of the second shaft 101b. The inner circumferential seal 111 is fixed so as to contact the braking shaft 101c. The through-hole seal 112 is attached to the through-hole 102f.

The first bobbin 106 is made of a non-magnetic material. The first coil 104 is wound around the first bobbin 106. The first bobbin 106 has an annular portion 106a having an annular shape and a wiring portion 106b. The annular portion 106a is disposed between the braking shaft 101c and the first coil 104, and faces the first shaft 101a with a gap. The outer circumferential surface of the annular portion 106a is engaged with the inner circumferential surface of the exterior 102a. A concave portion for fixing the outer circumferential seal 108 is formed on the outer circumferential surface of the annular portion 106a, and a concave portion for fixing the inner circumferential seal 110 is formed on the inner circumferential surface. The wiring portion 106b connects the wiring of the first coil 104 to a magnetic field control device (not shown) outside the housing 102.

The second bobbin 107 is made of a non-magnetic material, and fixed while contacting the second disc 102b. The second coil 105 is wound around the second bobbin 107. The second bobbin 107 also has an annular portion 107a having an annular shape and a wiring portion 107b. The annular portion 107a is disposed between the braking shaft 101c and the second coil 105, and faces the second shaft 101b via a gap. The outer circumferential surface of the annular portion 107a is engaged with the inner circumferential surface of the exterior 102a. A concave portion for fixing the outer circumferential seal 109 is formed on the outer circumferential surface of the annular portion 107a, and a concave portion for fixing the inner circumferential seal 111 is formed on the inner circumferential surface. The wiring portion 107b connects the wiring of the second coil 105 to the magnetic field control device (not shown) outside the housing 102.

Although the inner circumferential seal 110 is fixed to the first bobbin 106 so as to slidably contact the rotational shaft 101 in this embodiment, it may be fixed to the rotational shaft 101 so as to slidably contact the first bobbin 106. Although the inner circumferential seal 111 is fixed to the second bobbin 107 so as to slidably contact the rotational shaft 101 in this embodiment, it may be fixed to the rotational shaft 101 so as to slidably contact the second bobbin 107.

Figure 2:
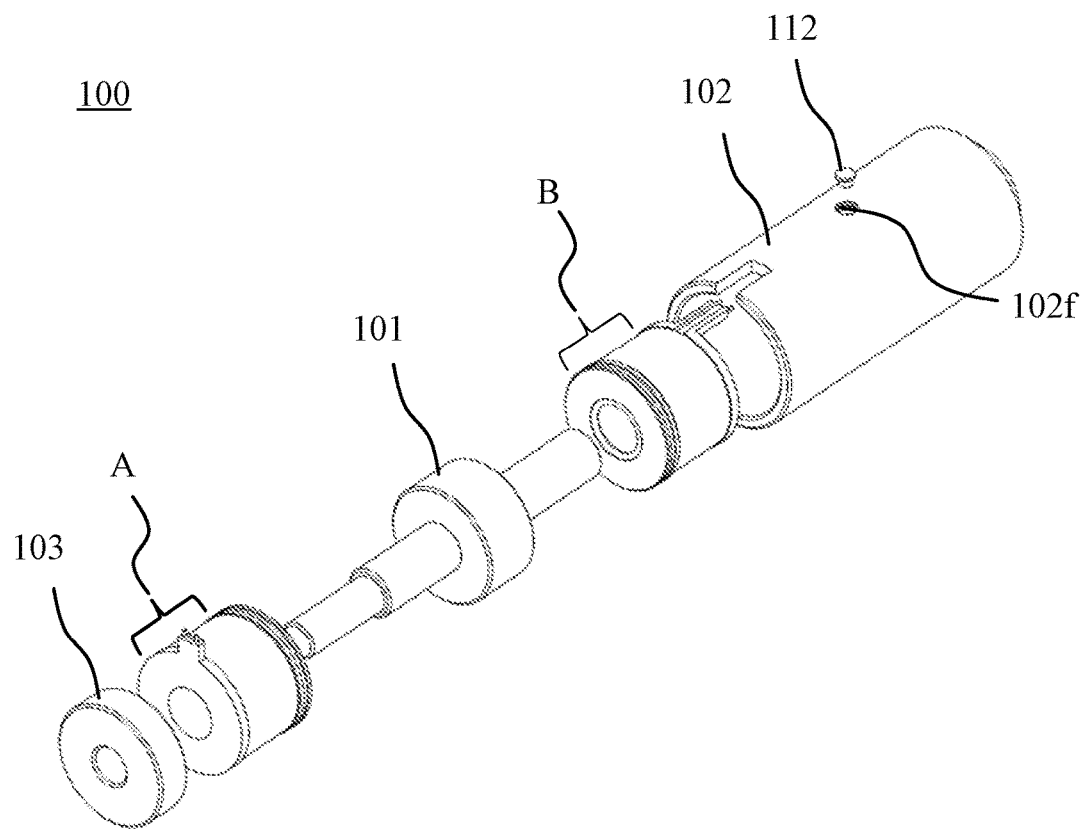
FIG. 2 is an exploded perspective view of the rotational resistance apparatus according to the first embodiment.

FIG. 2 is an exploded perspective view of the rotational resistance apparatus 100. In assembling the rotational resistance apparatus 100, first, a component group B, the rotational shaft 101, a component group A, and the first disc 103 are assembled in the housing 102 in this order. The component group A includes the first coil 104, the first bobbin 106, the outer circumferential seal 108, and the inner circumferential seal 110. The component group B includes the second coil 105, the second bobbin 107, the outer circumferential seal 109, and the inner circumferential seal 111. Next, the MR fluid F flows from the through-hole 102f. The MR fluid F is filled in a space between the outer circumferential surface of the braking shaft 101c and the inner circumferential surface of the exterior 102a. Finally, the through-hole seal 112 is fixed to the through-hole 102f. Thereby, the MR fluid F is sealed in an region enclosed by the rotational shaft 101, the housing 102, the first bobbin 106, the second bobbin 107, the outer circumferential seals 108 and 109, the inner circumferential seals 110 and 111, and the through-hole seal 112.

Referring now to FIGS. 3A to 3D, a description will be given of the principle that the resistance force of the MR fluid F is generated against the external force I. FIGS. 3A to 3D illustrate the principle that the resistance force of the MR fluid F is generated. The MR fluid F of the present invention is a fluid having a reversible property in which the resistance is remarkably increased (changed) by the application of the magnetic field and returned to the original resistance force by the removal of the magnetic field.

Figure 3A:
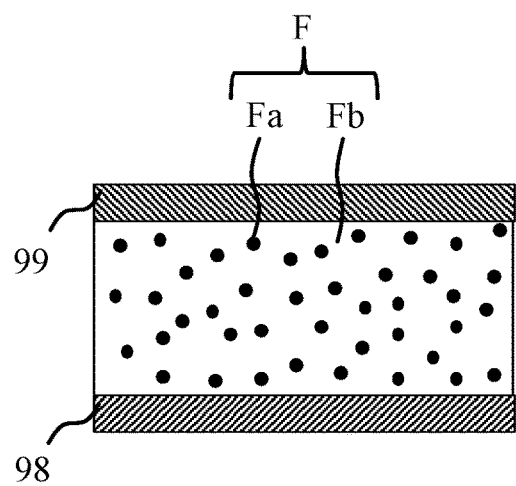
FIGS. 3A to 3D illustrate a principle of generating a resistance force of an MR fluid.
Figure 3B:
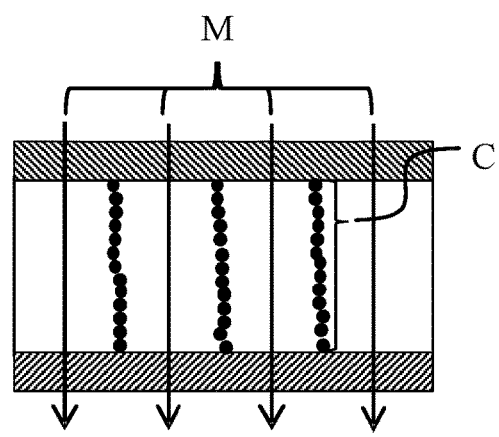
Figure 3C:
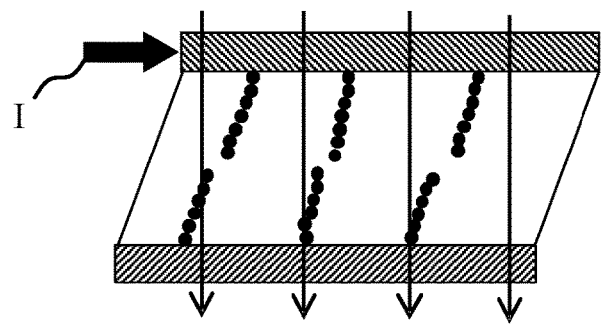
Figure 3D:
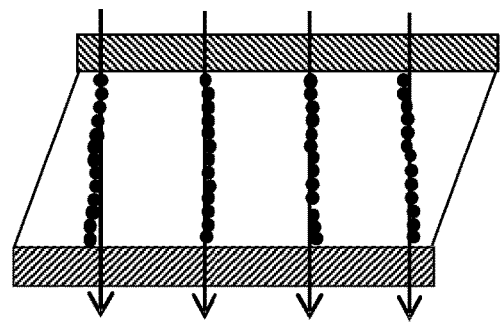

The MR fluid F is a fluid in which a myriad of magnetic particles Fa are dispersed in a solvent Fb as illustrated in FIG. 3A when the magnetic field M is not applied. When the magnetic field M is applied in the state of FIG. 3A, as illustrated in FIG. 3B, a large number of clusters C, which are aggregates of the magnetic particles Fa, are formed along the magnetic field direction. The cluster C is formed by the innumerable magnetic particles Fa magnetized by the magnetic field M that attract the nearby magnetic particles Fa. When the movable member 99 receives the external force I in the vertical direction of the magnetic field M as illustrated in FIG. 3C, the cluster C gradually extends while being inclined, and is severed. Until the cluster C is severed, attraction forces among the magnetic particles Fa are generated inside the cluster C. Once the cluster C is severed, the resistance does not disappear, and rather the cluster C randomly repeats severing and coupling as illustrated in FIGS. 3C and 3D, and consequently the predetermined resistance force can be generated against the predetermined magnetic field M. Thereby, the MR fluid F produces the predetermined resistance force. By increasing the strength of the magnetic field M, the attraction forces among the magnetic particles Fa generated inside the cluster C also become stronger and the resistance force against the external force I also becomes stronger. However, the cluster C in FIGS. 3A to 3D is explicitly illustrated in order to explain the principle that the resistance force of the MR fluid F is generated and in reality, countless clusters are formed by the countless magnetic particles Fa.

Figure 4:
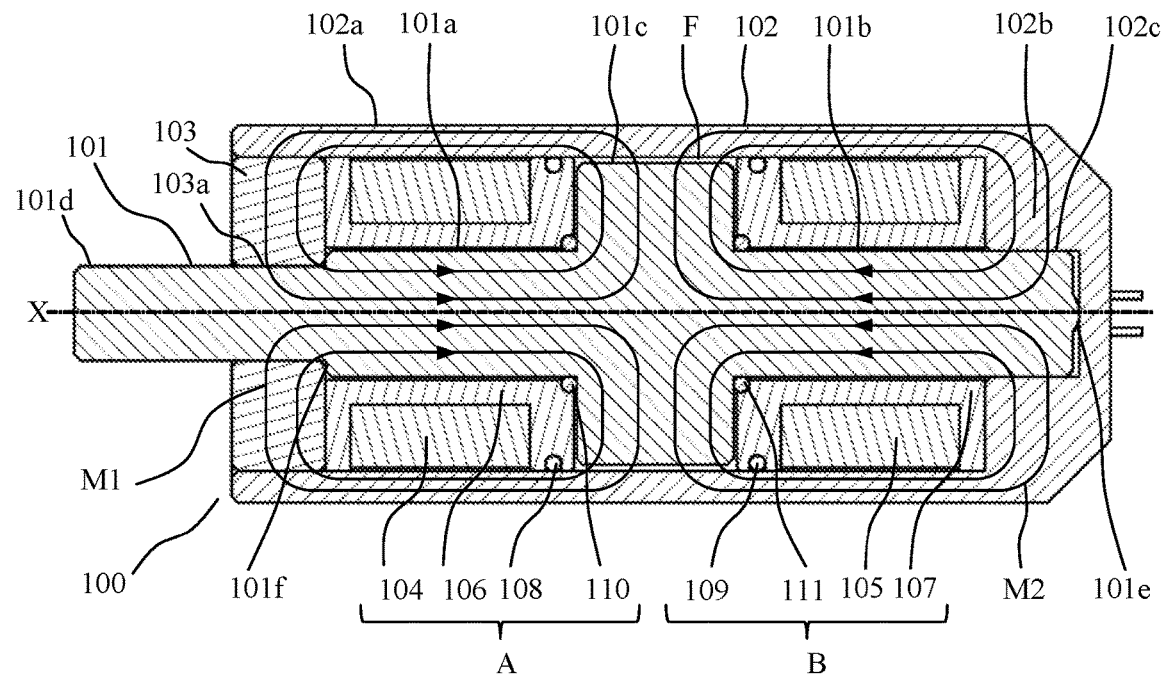
FIG. 4 illustrates a magnetic circuit according to the first embodiment.

Referring now to FIG. 4, a description will be given of the magnetic circuit generated in the rotational resistance apparatus 100. FIG. 4 illustrates a magnetic circuit according to this embodiment. In the rotational resistance apparatus 100, the first coil 104 and the second coil 105 are electrified so that opposite magnetic fluxes are generated in the first shaft 101a and the second shaft 101b, respectively. The magnetic flux generated in the first coil 104 forms a magnetic circuit M1 closed by an adjacent magnetic body, and the magnetic flux generated in the second coil 105 forms a magnetic circuit M2 closed by an adjacent magnetic body. The magnetic flux flowing from the first shaft 101a to the braking shaft 101c and the magnetic flux flowing from the second shaft 101b to the braking shaft 101c repel each other in the braking shaft 101c and flow on the outer circumferential surface of the braking shaft 101c. The magnetic flux flowing from the outer circumferential surface of the braking shaft 101c passes through the MR fluid F to the exterior 102a. Among the magnetic fluxes flowing to the exterior 102a, the magnetic flux generated in the first coil 104 flows in the exterior 102a on the first coil 104 side, and the magnetic flux generated in the second coil 105 flows in the exterior 102a on the second coil 105 side. The magnetic flux flowing through the exterior 102a on the first coil 104 side flows through the first disc 103 and returns to the first shaft 101a. The magnetic flux flowing through the exterior 102a on the second coil 105 side flows through the second disc 102b and returns to the second shaft 101b.

A description will now be given of the configuration for obtaining the braking torque at the rotational shaft 101. When the magnetic circuits M1 and M2 are generated with the configuration illustrated in FIG. 4, the magnetic fluxes generated in the first coil 104 and the second coil 105 pass through the MR fluid F from the outer circumferential surface of the braking shaft 101c to the inner circumferential surface of the exterior 102a. Due to this magnetic fluxes, innumerable clusters C are formed in the MR fluid F along the magnetic flux direction between the braking shaft 101c and the exterior 102a, and a resistance force that stops a relative rotation to the exterior 102a is applied to the braking shaft 101c and becomes the braking torque. As described above, by adjusting current amounts flowing through the first coil 104 and the second coil 105, it is possible to control the magnitude of the magnetic flux flowing through the MR fluid F and to generate an arbitrary braking torque in the rotational shaft 101.

In the magnetic circuits M1 and M2, almost all of the magnetic fluxes generated in the first coil 104 and the second coil 105 flow in the MR fluid F, so there is little waste magnetic fluxes that do not generate the braking torque, and the braking torque can be efficiently obtained. Since the rotational shaft 101 is rotatably engaged with the engagement recess 102c and the engagement hole 103a, the outer circumferential surface of the braking shaft 101c and the inner circumferential surface of the housing 102 are accurately coaxial. This structure maintains a non-contact state between the outer circumferential surface of the braking shaft 101c and the inner circumferential surface of the housing 102, reduces the gap between them and thereby the magnetic resistance of the magnetic circuit, and increases an amount of the flowing magnetic flux.

In this embodiment, the MR fluid F is sealed with the outer circumferential seals 108 and 109 and the inner circumferential seals 110 and 111, but the present invention is not limited to this embodiment. For example, the MR fluid F may be sealed by providing the first bobbin 106 and the second bobbin 107 with convex portions engaged with the rotational shaft 101 or engaged with the inner circumferential surface of the housing 102.

In this embodiment, the through-hole seal 112 is engaged with the through-hole 102f and seals the MR fluid F, but the present invention is not limited to this embodiment. For example, the through-hole seal 112 may be fixed with an adhesive agent or the like.

In this embodiment, the rotational resistance apparatus 100 has a shape that is long in the rotation center X direction and short in the direction orthogonal to the rotation center X, but the present invention is applicable even when it is short in the rotation center X direction and long in the direction orthogonal to the rotation center X.

Second Embodiment

Figure 5:
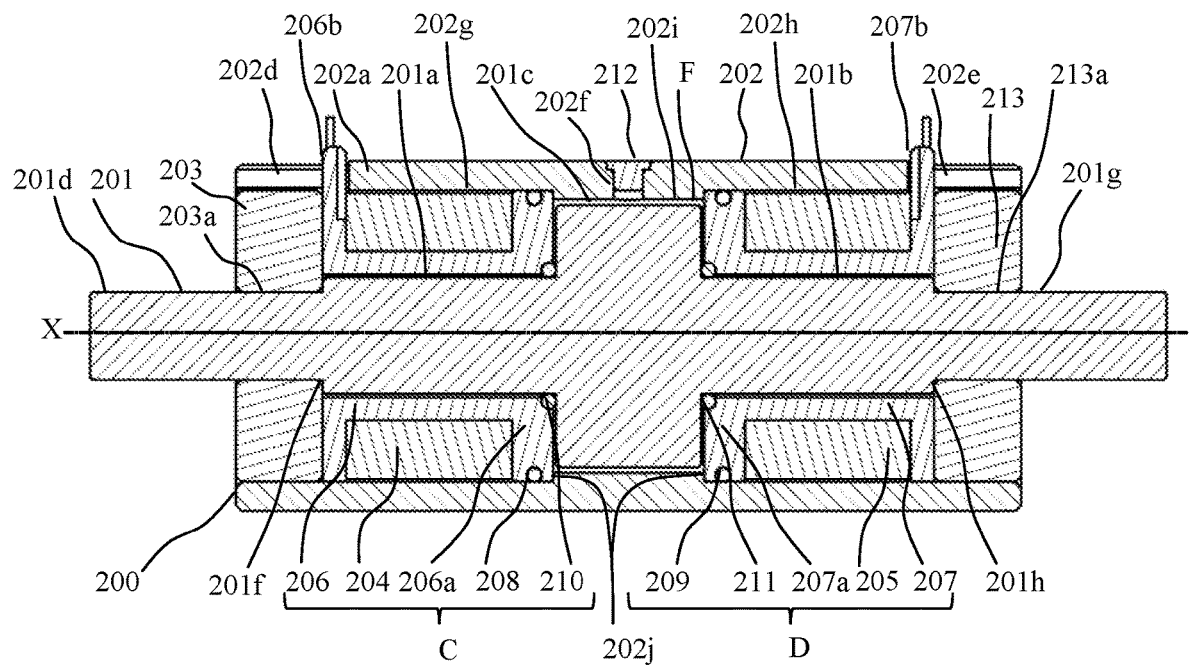
FIG. 5 is a sectional view of the rotational resistance apparatus according to a second embodiment.

FIG. 5 is a sectional view of the rotational resistance apparatus 200 according to this embodiment. In this embodiment, a structure different from that of the first embodiment will be described, and a detailed description of the common structure will be omitted.

The rotational resistance apparatus 200 includes a rotational shaft (rotational shaft member) 201 and a housing (housing member) 202.

A first coil 204, a second coil 205, a first bobbin 206, a second bobbin 207, and an MR fluid F are disposed inside the housing 202. The housing 202 includes a first disc (first disc portion) 203 having a first engagement hole (first engagement portion) 203a, and a second disc (second disc portion) 213 having a second engagement hole (second engagement portion) 213a.

An exterior 202a has a first opposite surface (first inner circumferential surface) 202g opposite to the first coil 204, a second opposite surface (second inner circumferential surface) 202h opposite to the second coil 205, and a third opposite surface (third inner circumferential surface) 202i opposite to a braking shaft 201c. Since the diameter of each of the first opposite surface 202g and the second opposite surface 202h is larger than that of the third opposite surface 202i, the exterior 202a has an inner circumferential step 202j opposite to the outer circumferential surface of the braking shaft 201c.

The rotational shaft 201 has a first transmission shaft 201d rotatably engaged with the first engagement hole 203a, and a second transmission shaft 201g rotatably engaged with the second engagement hole 213a. The rotational shaft 201 has a step 201f provided between the first transmission shaft 201d and the first shaft 201a and a step 201h provided between the second transmission shaft 201g and the second shaft 201b. In this embodiment, the first transmission shaft 201d and the second transmission shaft 201g project from the housing 202. Therefore, for example, by attaching a target to be braked to the first transmission shaft 201d and by providing an angle detector such as an encoder to the second transmission shaft 201g, the braking torque of the target can be adjusted according to the angle.

Figure 6:
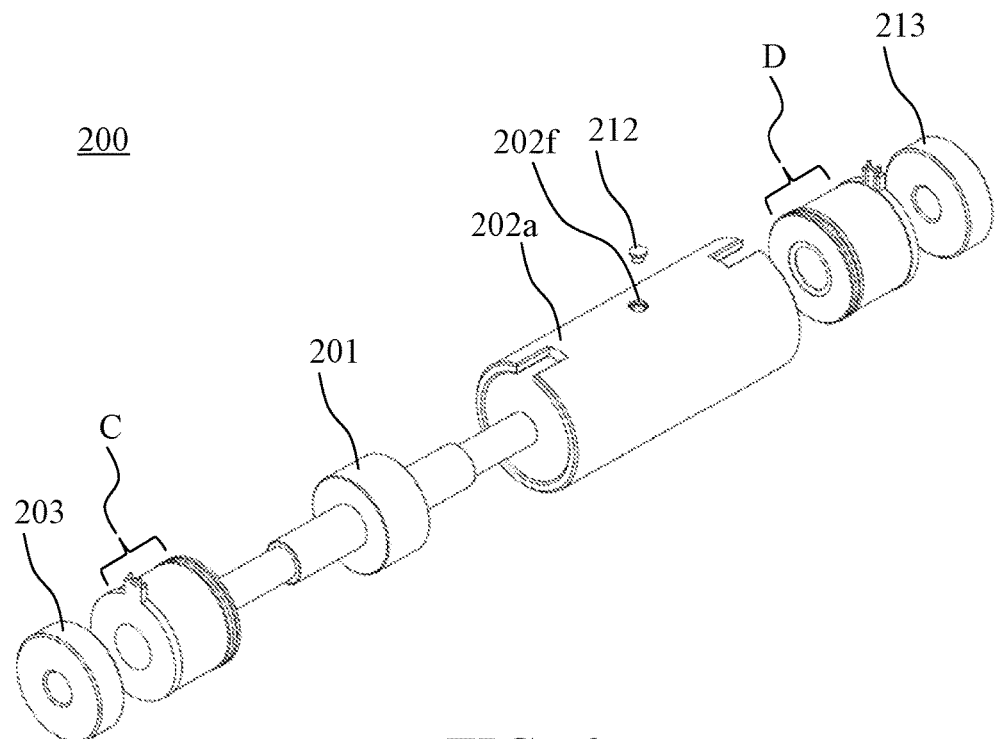
FIG. 6 is an exploded perspective view of a rotational resistance apparatus according to the second embodiment.

FIG. 6 is an exploded perspective view of the rotational resistance apparatus 200. In assembling the rotational resistance apparatus 200, first, a component group D and the second disc 213 are incorporated in the exterior 202a in this order from a first direction. The component group D includes the second coil 205, the second bobbin 207, the outer circumferential seal 209, and the inner circumferential seal 211. The component group D is positioned so that the second bobbin 207 contacts the inner circumferential step 202j of the exterior 202a. The second disc 213 is fixed to the exterior 202a while it contacts the second bobbin 207. At this time, the second bobbin 207 is fixed so that the inner circumferential step 202j and the second disc 213 contact each other.

Next, the rotational shaft 201, a component group C, and the first disc 203 are assembled in this order in the exterior 202a from a second direction opposite to the first direction. The component group C includes the first coil 204, the first bobbin 206, the outer circumferential seal 208, and the inner circumferential seal 210. When the rotational shaft 201 is incorporated in the exterior 202a, the second transmission shaft 201g is rotatably engaged with the second engagement hole 213a, and the braking shaft 201c contacts the inner circumferential seal 211. The component group C is positioned so that the first bobbin 206 contacts the inner circumferential step 202j. At this time, the inner circumferential seal 210 is sandwiched between the braking shaft 201c and the first bobbin 206, and deformed, and the inner circumferential seal 211 is sandwiched between the braking shaft 201c and the second bobbin 207, and deformed. The first disc 203 is fixed to the exterior 202a while it contacts the first bobbin 206. At this time, the first bobbin 206 is fixed so that the inner circumferential step 202j and the first disc 203 contact each other from both sides.

Next, the MR fluid F is introduced from the through-hole 202f. Finally, the through-hole seal 212 is fixed to the through-hole 202f.

In this embodiment, the first bobbin 206 and the second bobbin 207 are fixed by the first disc 203 and the second disc 213, respectively, while they contact the inner circumferential step 202j, so that the hermetical sealing performance of the MR fluid F improves. Since the steps 201f and 201h are respectively positioned by the first disc 203 and the second disc 213, the rotational shaft 101 is restricted from moving in the rotation center X direction.

Figure 7:
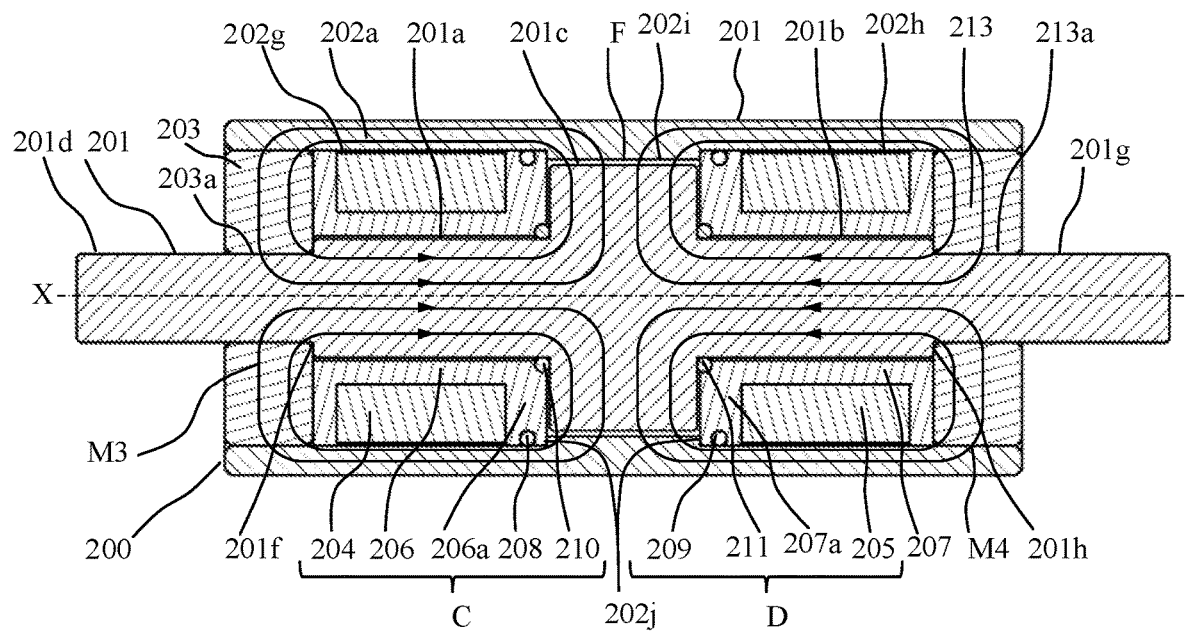
FIG. 7 illustrates a magnetic circuit according to the second embodiment.

Referring now to FIG. 7, a description will be given of a magnetic circuit generated in the rotational resistance apparatus 200. FIG. 7 illustrates the magnetic circuit according to this embodiment. In the rotational resistance apparatus 200, the first coil 204 and the second coil 205 are electrified so that opposite magnetic fluxes are generated by the first shaft 201a and the second shaft 201b. A magnetic circuit M3 is formed by the magnetic flux generated by the first coil 204, and a magnetic circuit M4 is formed by the magnetic flux generated by the second coil 205.

Figure 8A:
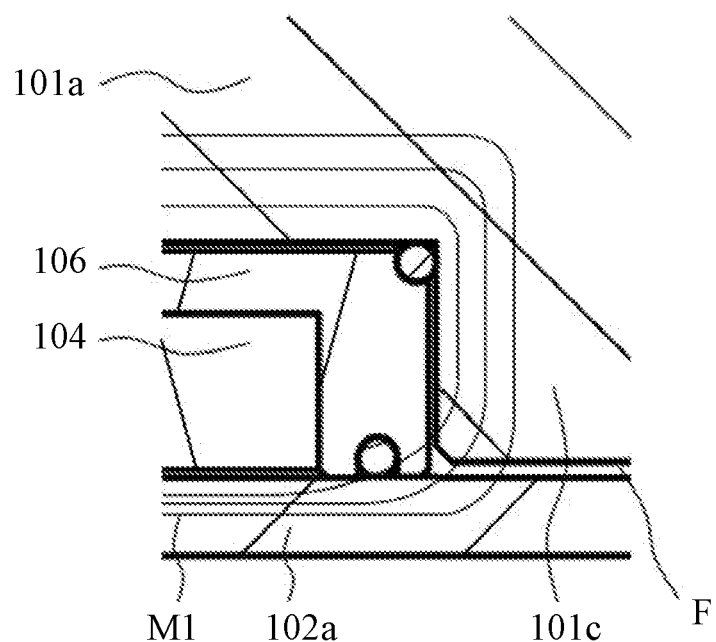
FIGS. 8A and 8B are enlarged views of the magnetic circuit according to the second embodiment.
Figure 8B:
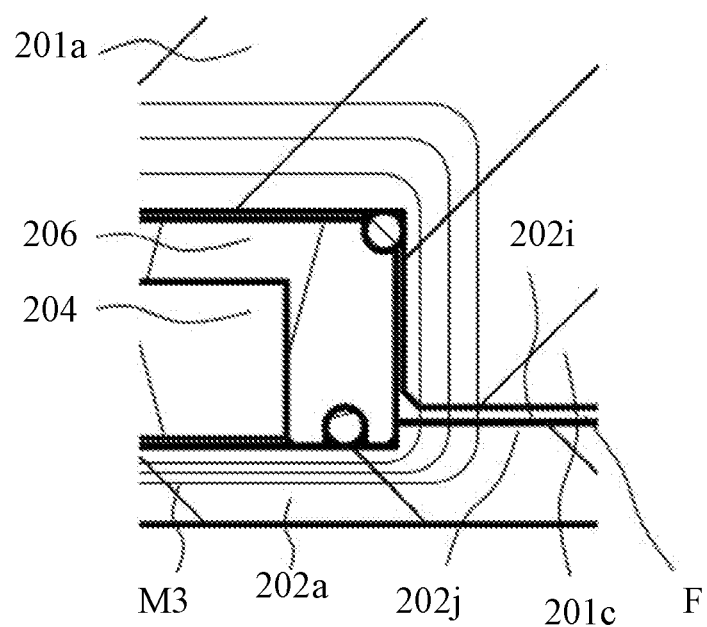

Referring now to FIGS. 8A and 8B, a description will be given of the effect when the inner circumferential step 202j changes the flow of magnetic flux. FIGS. 8A and 8B are enlarged views of the magnetic circuit according to this embodiment. FIG. 8A illustrates part of the magnetic circuit M1 in which the magnetic flux generated in the first coil 104 according to the first embodiment flows. FIG. 8B illustrates part of the magnetic circuit M3 in which the magnetic flux generated in the first coil 204 according to this embodiment flows.

When no inner circumferential step 202j is provided to the inner circumferential surface of the exterior 102a, the magnetic flux flowing from the braking shaft 101c is attracted to the inner circumferential surface of the exterior 102a as illustrated in FIG. 8A, and flows while turning to the side of the first bobbin 206. Thus, the magnetic flux passing through the MR fluid F decreases, and the magnetic flux density decreases. On the other hand, when the inner circumferential step 202j is provided to the inner circumferential surface of the exterior 202a, the magnetic flux flowing from the braking shaft 201c is attracted to the third opposite surface 202i of the inner circumferential step 202j as illustrated in FIG. 8B. Thus, the magnetic flux passing through the MR fluid F increases and the magnetic flux density increases.

In this embodiment, the first disc 203 and the second disc 213 are formed separately from the exterior 202a, but the present invention is not limited to this embodiment as long as the exterior 202a having the inner circumferential step 202j can be incorporated with the component groups C and D and the rotational shaft 101. For example, the first disk 203 and the second disk 213 may be integrated with the outer cover 202a when the outer cover 202a includes a plurality of components.

Third Embodiment

Figure 9:
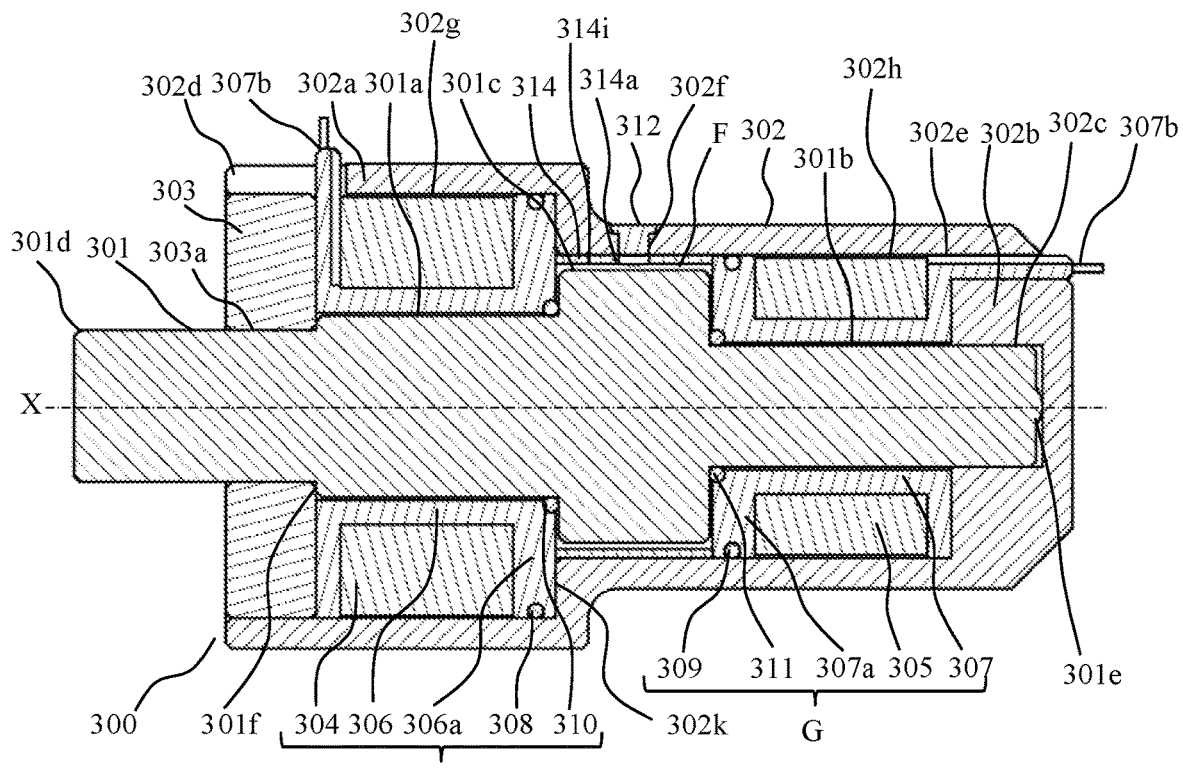
FIG. 9 is a sectional view of a rotational resistance apparatus according to a third embodiment.

FIG. 9 is a sectional view of a rotational resistance apparatus 300 according to this embodiment. In this embodiment, a configuration different from that of the first or second embodiment will be described, and a detailed description of the common configuration will be omitted.

The rotational resistance apparatus 300 includes a rotational shaft (rotational shaft member) 301 and a housing (housing member) 302.

A first coil 304, a second coil 305, a first bobbin 306, a second bobbin 307, and an MR fluid F are disposed inside the housing 302. The housing 302 has an exterior (first cylindrical portion) 302a and a ring (second cylindrical portion) 314 disposed between the rotational shaft 301 and the exterior 302a.

The exterior 302a has a first opposite surface (first inner circumferential surface) 302g opposite to the first coil 304, and a second opposite surface (second inner circumferential surface) 302h opposite to the second coil 205.

The ring 314 is engaged with and fixed to the inner circumferential surface of the outer housing 302a, and has a through-hole 314a formed at the same position as each of the third opposite surface (third inner circumferential surface) 314i opposite to the braking shaft 301c and the through-hole 302f provided in the outer housing 302a. The ring 314 is fixed so as to abut against the second bobbin 307.

In assembling the rotational resistance apparatus 300, first, a component group G, the ring 314, the rotational shaft 301, a component group E, and the first disc 303 are assembled in the housing 302 in this order. The component group E includes the first coil 304, the first bobbin 306, the outer circumferential seal 308, and the inner circumferential seal 310. The component group G includes the second coil 305, the second bobbin 307, the outer circumferential seal 309, and the inner circumferential seal 311. Next, the MR fluid F is introduced from the through-hole 302f. Finally, the through-hole seal 312 is fixed to the through-hole 302f.

The diameter of the component group E is larger than that of the component group G, and the diameter of the first shaft 301a is larger than that of the second shaft 302b. Therefore, the diameter of the inner circumferential surface engaged with the outer circumferential surface of the exterior 302a on the component group E side is larger than that of the inner circumferential surface engaged with the outer circumferential surface of the component group G side, and the housing 302 has a step 302k. The component group E is fixed while it contacts the step 302k and the ring 314.

In this embodiment, the diameter of each of the first opposite surface 302g and the second opposite surface 302h is larger than that of the third opposite surface 314i, so the exterior 302a has the ring 314 facing the outer circumferential surface of the braking shaft 301c. Due to the ring 314 configured as a separate body, the magnetic flux flowing from the braking shaft 301c can be attracted to the third opposite surface 314i, and the rotational resistance apparatus 300 can be incorporated from one side direction of the exterior 202a. Since the ring 314 has the through-hole 314a at the same position as that of the through-hole 302f, the MR fluid F can flow in from the through-holes 302f and 314a, and the positioning and fixing of the component groups E and G becomes easy.

Figure 10:
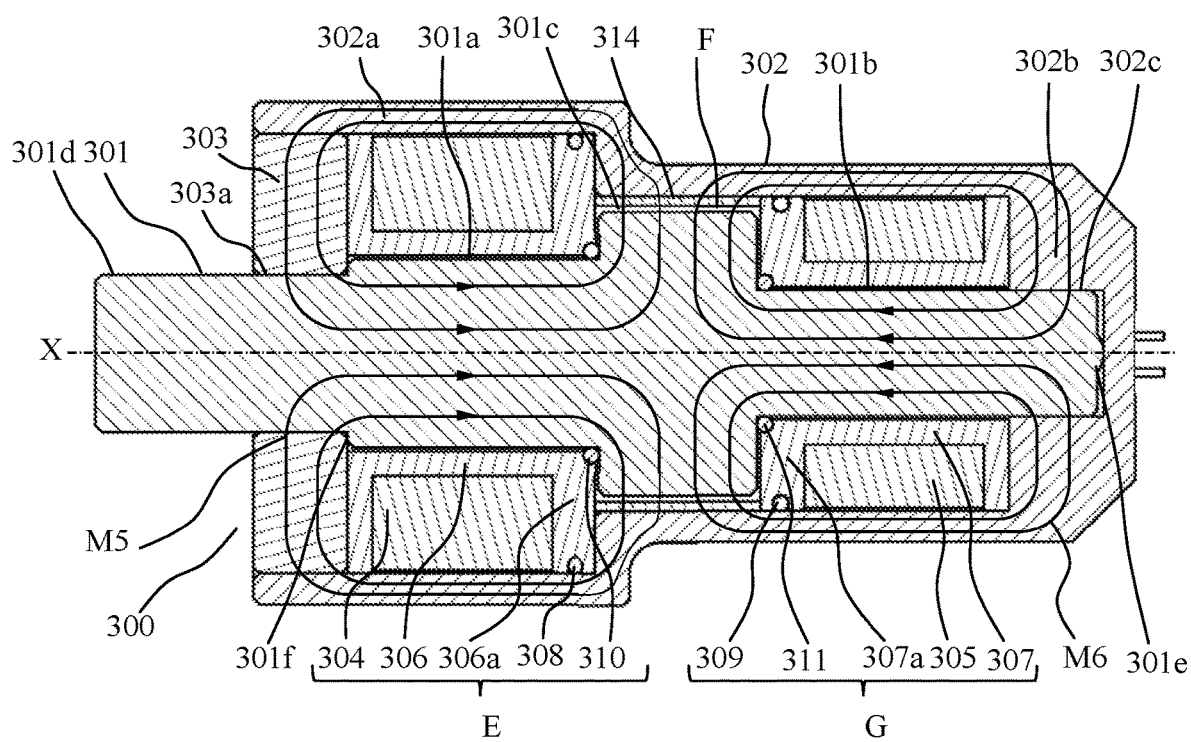
FIG. 10 illustrates a magnetic circuit according to the third embodiment.

Referring now to FIG. 10, a description will be given of a magnetic circuit generated in the rotational resistance apparatus 300. FIG. 10 illustrates a magnetic circuit according to this embodiment. In the rotational resistance apparatus 300, the first coil 304 and the second coil 305 are electrified so that the opposite magnetic fluxes are generated in the first shaft 301a and the second shaft 301b, respectively. A magnetic circuit M5 is formed by the magnetic flux generated by the first coil 304, and a magnetic circuit M6 is formed by the magnetic flux generated by the second coil 305. The magnetic flux flowing from the braking shaft 301c is attracted to the third opposite surface 314i, and many magnetic fluxes flow through the third opposite surface 314i.

The configuration according to this embodiment can realize a compact rotational resistance apparatus 300 with high efficiency even when it has a step like the exterior 302a. In other words, the rotational resistance apparatus 300 has a high degree of freedom in arrangement and configuration. For example, when a gear is attached to the transmission shaft 301d, making the component group E smaller than the component group G can realize a configuration that facilitates the gear connection.

Fourth Embodiment

Figure 11:
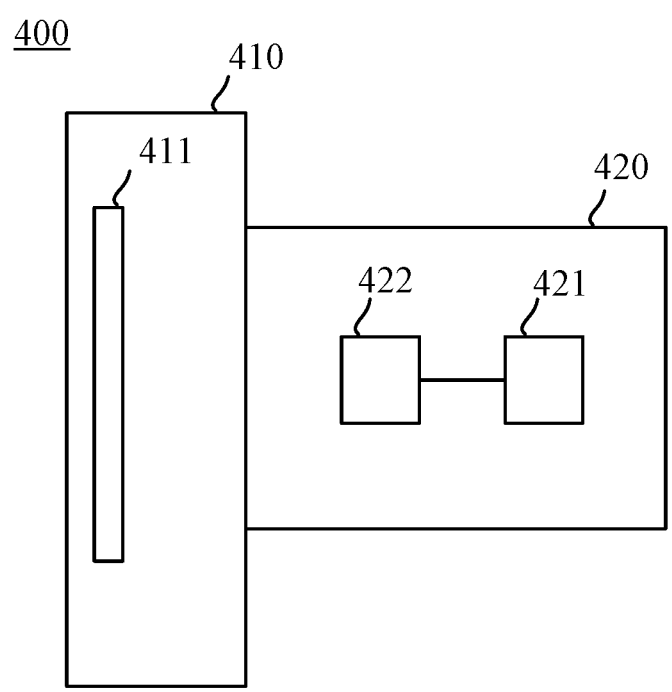
FIG. 11 illustrates an image pickup apparatus as an illustrative electronic apparatus including the rotational resistance apparatus.

FIG. 11 is a schematic diagram of an image pickup apparatus 400 serving as an illustrative electronic apparatus including the rotational resistance apparatus. The image pickup apparatus 400 includes a camera body 410 and a lens barrel 420. The camera body 410 holds an image sensor 411. The lens barrel 420 has an operation member 421 that moves an optical element such as a zoom ring and a focus ring, and a rotational resistance apparatus 422 connected to the operation member 421. The image sensor 411 is configured to receive an image formed through the optical element. The rotational resistance apparatus 422 includes the rotational resistance apparatus according to any one of the first to third embodiments. The lens barrel 420 may be integrated with the camera body 410 or detachably attached to the camera body 410. The lens barrel 420 may hold the image sensor 411.

The rotational resistance apparatus according to the present invention is applicable, for example, to a remote surgery device equipped with a function of presenting a feeling of touching an organ of a patient.

The above embodiments can provide a rotational resistance apparatus advantageous to a high performance and a compact structure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-128763, filed on Jul. 10, 2019, which is hereby incorporated by reference herein in its entirety.

What is claimed is:

1. A rotational resistance apparatus comprising:
 a rotational shaft member made of a magnetic material and including:
  a first shaft portion;
  a second shaft portion; and
  a third shaft portion disposed between the first shaft portion and the second shaft portion along an axial direction of the rotational shaft member, a diameter of the third shaft portion being larger than that of each of the first shaft portion and the second shaft portion;
 a housing member made of a magnetic material and configured to hold the rotational shaft member;
 a first bobbin, with a first coil wound around the first bobbin, disposed between an outer circumferential surface of the first shaft portion and an inner circumferential surface of the housing member;
 a second bobbin, with a second coil wound around the second bobbin, disposed between an outer circumferential surface of the second shaft portion and the inner circumferential surface of the housing member; and
 a magnetic viscose fluid disposed between an outer circumferential surface of the third shaft portion and the inner circumferential surface of the housing member, and disposed between the first coil and the second coil along the axial direction of the rotational shaft member,
 wherein first magnetic flux generated in a first magnetic circuit by the first coil and second magnetic flux generated in a second magnetic circuit by the second coil simultaneously pass through the magnetic viscose fluid, and
 wherein at least part of the first coil and at least part of the second coil overlap with the third shaft portion and the magnetic viscose fluid, as viewed from one end of the rotational shaft member in the axial direction.

2. The rotational resistance apparatus according to claim 1, wherein the rotational shaft member and the housing member form the first magnetic circuit by the first coil and the second magnetic circuit by the second coil by electrifying the first coil and the second coil so that magnetic fluxes are generated in opposite directions in the first shaft portion and the second shaft portion, respectively.

3. The rotational resistance apparatus according to claim 1, wherein:
the housing member includes:
a first inner circumferential surface opposite to the outer circumferential surface of the first shaft portion;
a second inner circumferential surface opposite to the outer circumferential surface of the second shaft portion; and
a third inner circumferential surface opposite to the outer circumferential surface of the third shaft portion, and a diameter of each of the first inner circumferential surface and the second inner circumferential surface is larger than that of the third inner circumferential surface.

4. The rotational resistance apparatus according to claim 1, further comprising:
a first seal disposed between the first coil and the third shaft portion in an axial direction of the rotational shaft member, and configured to seal a gap between an outer circumferential surface of the first bobbin and the inner circumferential surface of the housing member;
a second seal disposed between the second coil and the third shaft portion in the axial direction, and configured to seal a gap between an outer circumferential surface of the second bobbin and the inner circumferential surface of the housing member;
a third seal disposed between the first coil and the third shaft portion in the axial direction, and configured to seal a gap between an inner circumferential surface of the first bobbin and the outer circumferential surface of the first shaft portion; and
a fourth seal disposed between the second coil and the third shaft portion in the axial direction, and configured to seal a gap between an inner circumferential surface of the second bobbin and an outer circumferential surface of the second shaft portion.

5. The rotational resistance apparatus according to claim 1, wherein:
the housing member includes:
a first disc portion rotatably engaged with the rotational shaft member;
a second disc portion rotatably engaged with the rotational shaft member; and
a cylindrical portion disposed between the first disc portion and the second disc portion, and
the cylindrical portion is configured separately from at least one of the first disc portion or the second disc portion.

6. The rotational resistance apparatus according to claim 1, wherein:
the housing member includes:
a first disc portion rotatably engaged with the rotational shaft member;
a second disc portion rotatably engaged with the rotational shaft member; and
a cylindrical portion disposed between the first disc portion and the second disc portion, and
the cylindrical portion is integral with the first disc portion and the second disc portion.

7. The rotational resistance apparatus according to claim 1, wherein the first coil and the second coil contact the inner circumferential surface of the housing member.

8. An electronic apparatus comprising:
a rotational resistance apparatus; and
an operating member connected to the rotational resistance apparatus,
wherein the rotational resistance apparatus includes:
a rotational shaft member made of a magnetic material and including:
a first shaft portion;
a second shaft portion; and
a third shaft portion disposed between the first shaft portion and the second shaft portion along an axial direction of the rotational shaft member, a diameter of the third shaft portion being larger than that of each of the first shaft portion and the second shaft portion;
a housing member made of a magnetic material and configured to hold the rotational shaft member;
a first bobbin, with a first coil wound around the first bobbin, disposed between an outer circumferential surface of the first shaft portion and an inner circumferential surface of the housing member;
a second bobbin, with a second coil wound around the second bobbin, disposed between an outer circumferential surface of the second shaft portion and the inner circumferential surface of the housing member; and
a magnetic viscose fluid disposed between an outer circumferential surface of the third shaft portion and the inner circumferential surface of the housing member, and disposed between the first coil and the second coil along the axial direction of the rotational shaft member,
wherein first magnetic flux generated in a first magnetic circuit by the first coil and second magnetic flux generated in a second magnetic circuit by the second coil simultaneously pass through the magnetic viscose fluid, and
wherein at least part of the first coil and at least part of the second coil overlap with the third shaft portion and the magnetic viscose fluid, as viewed from one end of the rotational shaft member in the axial direction.

9. The electronic apparatus according to claim 8, further comprising an optical element movable by the operating member.

10. The electronic apparatus according to claim 9, further comprising an image sensor configured to receive an image formed through the optical element.

11. The rotational resistance apparatus according to claim 1, wherein:
the housing member includes:
a first disc portion made of a magnetic material and rotatably engaged with the rotational shaft member;
a second disc portion made of a magnetic material and rotatably engaged with the rotational shaft member; and
a cylindrical portion disposed between the first disc portion and the second disc portion,
the cylindrical portion is configured separately from at least one of the first disc portion or the second disc portion,
the first magnetic flux generated in the first magnetic circuit by the first coil flows through the first disc portion and passes through the magnetic viscose fluid, and
the second magnetic flux generated in the second magnetic circuit by the second coil flows through the second disc portion and passes through the magnetic viscose fluid.

12. The electronic apparatus according to claim 8, wherein:
- the housing member includes:
  - a first disc portion made of a magnetic material and rotatably engaged with the rotational shaft member;
  - a second disc portion made of a magnetic material and rotatably engaged with the rotational shaft member; and
  - a cylindrical portion disposed between the first disc portion and the second disc portion,
- the cylindrical portion is configured separately from at least one of the first disc portion or the second disc portion,
- the first magnetic flux generated in the first magnetic circuit by the first coil flows through the first disc portion and passes through the magnetic viscose fluid, and
- the second magnetic flux generated in the second magnetic circuit by the second coil flows through the second disc portion and passes through the magnetic viscose fluid.

\* \* \* \* \*